Nov. 5, 1940.    T. E. J. SHANAHAN    2,220,734
METHOD AND MEANS FOR OBTAINING ACCURATE OCCLUSION
Filed Jan. 27, 1940    2 Sheets—Sheet 1
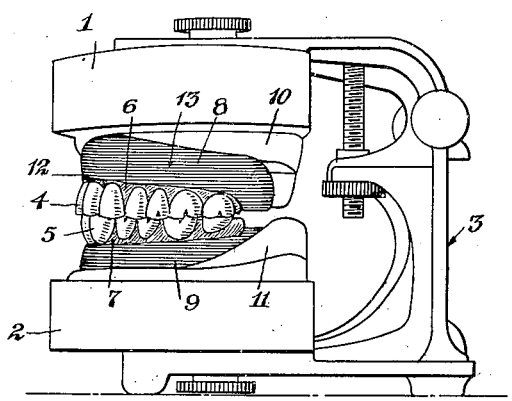
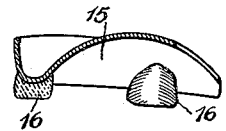
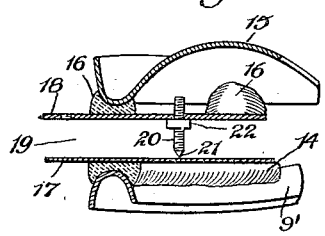
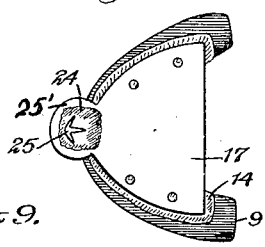
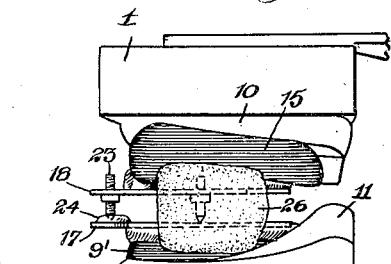
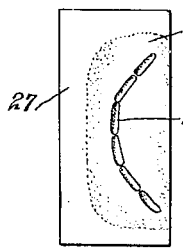
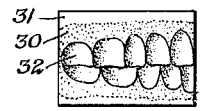
INVENTOR
Thomas E. J. Shanahan
BY
Munn, Anderson & Liddy
ATTORNEYS

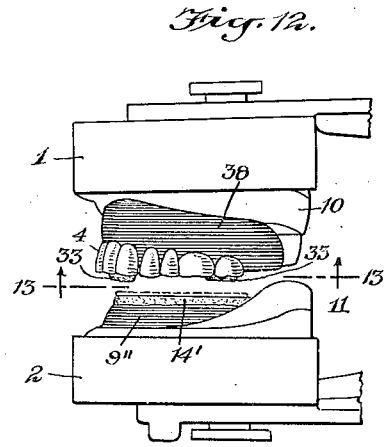
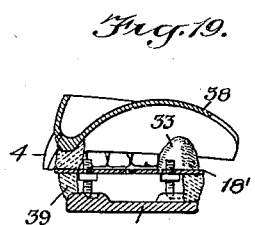
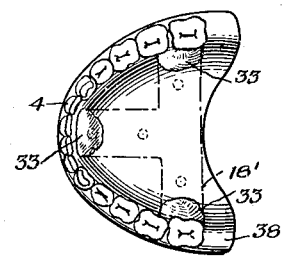
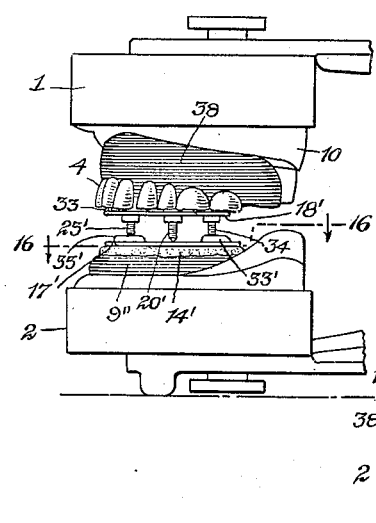
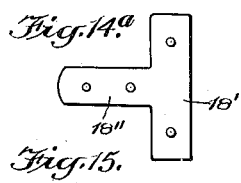
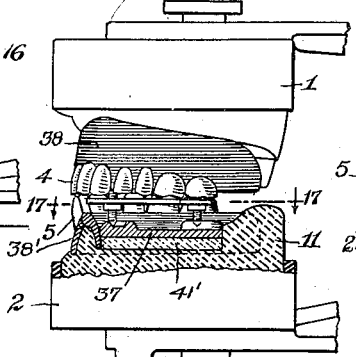
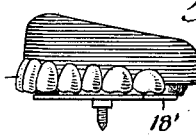
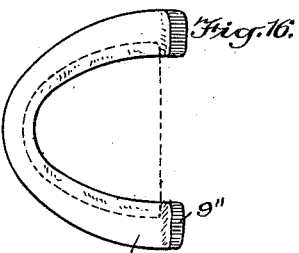
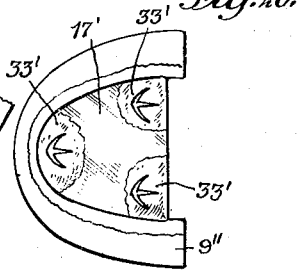

Patented Nov. 5, 1940

2,220,734

UNITED STATES PATENT OFFICE 2,220,734

METHOD AND MEANS FOR OBTAINING ACCURATE OCCLUSION

Thomas E. J. Shanahan, Brooklyn, N. Y.

Application January 27, 1940, Serial No. 315,939

5 Claims. (Cl. 32—19)

This invention relates to dental appliances and methods of using the same, and has for an object to provide an improved method and means for obtaining an accurate occlusion before dentures are completed.

Another object of the invention is the provision of an improved method and apparatus wherein most of the work of properly placing teeth in dentures and in securing an accurate occlusion is done exteriorly of the mouth of a patient.

A further object of the invention is the provision of an improved method of forming record members or plates which are adapted to be used in properly setting the teeth in a temporary denture plate and later in securing an accurate occlusion.

An additional object of the invention is the provision of an improved method and instrument for recording the movements of the lower jaw in respect to the upper jaw.

In the accompanying drawings—

Fig. 1 is a side view of an articulator with temporary upper and lower dentures in place;

Fig. 2 is a sectional view through an upper base plate similar to that shown in Fig. 1;

Fig. 3 is a view similar to Fig. 2 but showing the lower base plate;

Fig. 4 is a view similar to Fig. 3 but illustrating a rim of wax or other plastic matter arranged thereon;

Fig. 5 is a sectional view illustrating a second pair of upper and lower base plates together with certain instruments in association therewith;

Fig. 6 is a view similar to Fig. 5 but illustrating a scribing pin and wax coacting therewith;

Fig. 7 is a sectional view through Fig. 6 approximately on the line 7—7;

Fig. 8 is a view similar to Fig. 6 but with the upper and lower plates arranged in an articulator and with a locking plaster of Paris member;

Fig. 9 is a record of the occlusal area of the upper teeth of the denture;

Fig. 10 is a side view illustrating upper and lower dentures with a side record plate applied thereto;

Fig. 11 is a view of the record plate shown in Fig. 10 viewing the same from the opposite side and after the plate has been moved from the trial denture;

Fig. 12 is a view similar to Fig. 1 but showing an upper processed denture and a lower processed denture base plate without the teeth;

Fig. 13 is a bottom plan view of the upper denture shown in Fig. 12 together with a T-plate and means for holding the plate in position;

Fig. 13a is a side view of the structure shown in Fig. 13 provided with a center pin;

Fig. 14 is a view similar to Fig. 12 but showing a number of pins in operative position;

Fig. 14a is a plan view of the T-plate shown in Fig. 13a;

Fig. 15 is a view similar to that shown in Fig. 1 but illustrating the processed dentures together with a metal centering record plate and associated parts;

Fig. 16 is a sectional view through Fig. 14 on the line 16—16;

Fig. 17 is a top plan view of the lower denture shown in Fig. 15 together with the metal record which is a duplicate of the stage plate and wax impression shown in Fig. 20;

Fig. 18 is a plan view of a metal record plate which is a duplicate of the stage plate and the wax impression shown in Fig. 20;

Fig. 19 is a longitudinal vertical sectional view through the upper denture shown in Fig. 14 together with the record plate shown in Fig. 18;

Fig. 20 is a top plan view of the lower denture plate shown in Fig. 14 together with a wall and stage plate in position ready for casting the metal record illustrated in Fig. 18;

Fig. 21 is a side view of the completed processed dentures mounted on the lower part of an articulator ready for the final inspection and correction.

In the production of dentures great difficulty has been experienced heretofore in accurately producing complete occlusion for the artificial teeth. The base plate and teeth of the upper part of a set of dentures is known as the upper denture and the similar portion of the lower part is known as the lower denture, each denture consisting of a base plate adapted to fit one of the jaws and teeth embedded therein. To cause a proper fit of the base plates to both the upper and the lower jaws and, at the same time, to produce a proper and accurate occlusion of the teeth is very difficult. Quite often dentists produce these plates as accurate as possible and also the occlusion as accurate as possible and then they are turned over to the patient to be used. In case they do not fit accurately or there is any objection whatever, the patient returns to the dentist and the latter grinds off certain parts or attempts to secure a proper occlusion so that the teeth may be used in the usual way of natural teeth.

To overcome these objections and to be sure of an accurate occulsion when the teeth are finished and turned over to the patient, an improved method and apparatus have been provided. In carrying out the method, a pair of temporary dentures are provided, as illustrated particularly in Fig. 1. These dentures are formed in the usual way now in common practice. Briefly, this consists in forming an impression of the jaws, then forming a cast, and pressing a plate of prepared shellac over the cast. The cast, of course, will be a negative of the respective jaws and then the sheet of base plate material is forced thereon. This is pressed in position until it accurately fits the negatives. Any protruding parts may be trimmed off and the plate tried in the mouth of the patient. It should fit accurately and it usually does. A supply of wax, usually known as a rim, is applied to the respective upper and lower base plates and then the teeth are applied in the usual way. As the method up to the present point is old and well known, it is believed that this brief outline will be sufficient.

As indicated in Fig. 1, the numeral 1 indicates the upper arm and 2 the lower arm of an articulator 3. This articulator is an old and well-known device now in common use. The respective teeth 4 and 5 are held in place by wax 6 and 7 in the usual way, the wax being mounted on the respective upper and lower base plates 8 and 9 which are formed as above described. Stone casts 10 and 11 are also provided, said casts having one of their respective surfaces fitting into the respective base plates. The other surface is held in the articulator either by friction or by plaster of Paris or other suitable material. After the temporary dentures have been formed, as shown in Figure 1, they are placed in the mouth of the patient so that the dentist may examine the same to see if they have the right appearance. If any of the teeth should be misplaced or slightly out of line, the dentist makes the desired correction until the teeth have the correct appearance. At this time indicating front and side lines 12 and 13 are marked on the respective upper and lower base plates. The side lines 13 indicate the edges of the mouth while the line 12 indicates the center of the front. This method so far is old and well known but is the first step in the method included in the present invention. It will be understood that the respective teeth 4 and 5 of the temporary dentures occlude properly or as near thereto as the dentist can make the same occlude.

After the temporary set illustrated in Fig. 1 has been examined in the patient's mouth, it is removed and the patient is dismissed for the time being. The upper and lower temporary dentures are then laid aside. The dentist now makes new or duplicate upper and lower base plates 15 and 9' identical with plates 8 and 9. On the duplicate lower base plate 9' a rim of modeling compound 14 (Fig. 4) is mounted. Fig. 4 shows approximately half of the duplicate lower base plate 9'. The modeling compound 14, which is a well-known compound used by dentists, is approximately half as high as the teeth 5.

After the rim 14 has been applied as shown in Fig. 4, the new upper base plate 15 is supplied with three blocks of modeling compound 16, there being one block at the center of the front and the other two blocks in the respective first molar regions. These blocks are approximately the same height as the rim of modeling compound 14, namely, one-half the height of the teeth 4. A metal stage plate 17 is then placed on the rim 14. In order for the stage plate to adhere the upper edge of the modeling compound 14 may be softened by heat. After the stage plate 17 has been placed in position, it will appear substantially as shown in Fig. 5. On the upper base plate 15 a T-shaped plate 18 is placed with the center leg projecting beyond the base plate. The modeling compound 10 of block 16 may be slightly heated to cause plate 18 to adhere thereto, as illustrated in Fig. 5. The plates 17 and 18 are positioned as nearly parallel as can be done by checking the position of the plates by the eye of the dentist. This leaves a space 19 between the plates. The stage plate 17 is then provided with a mark on the upper surface approximately at the center of the lower base plate. A pointed threaded member or pin 20 is then screwed into the T-plate 18 and adjusted until the point 21 barely touches the mark on the stage plate 17. A lock nut 22 may be used for locking the pin against accidental movement. The point 21 is adapted to barely touch the stage plate 17 when the parts have been placed in an articulator and the arms of the articulator closed. When this has been done the upper arm 1 of the articulator is swung back and a pointed screw or pin 23 is placed as shown in Fig. 6, which is beyond the front of the upper base plate 15. The pin 23 is identical in structure with pin 20, but the point thereof is placed near but not touching the stage plate 17, as shown in Fig. 6. While the articulator is open a small supply of soft wax 24 is placed on the stage plate 17 so as to cover the zone in the vicinity of the pin 23 when the articulator is closed. It will be seen, therefore, that when the articulator is closed the pointed end of pin 23 will embed itself in the wax 24 so as to become a scribing pin when moved forwardly, rearwardly, or laterally.

The upper and lower base plates 15 and 9' are then placed in the patient's mouth and the patient is requested to chew on the right and left sides of the mouth and also to move the lower jaw forwardly and rearwardly. If the patient has been properly instructed and trained in jaw movements by the dentist, a Gothic arch 25 will be formed as shown in Fig. 7. These movements are performed with the mouth in the regular chewing manner with pin 20 acting to prevent the lower jaw closing beyond the accepted opening, so that the pointed end of pin 23 will provide a groove or depression in three dimensions presenting a Gothic arch formation, as shown at 25 in Fig. 7. When the pin 23 is at the apex of the arch 25, the jaws are in centric relation with each other. After the arch has been formed and the pin 23 moved back to the centric position, the upper and lower base plates are locked together by any suitable means. Preferably plaster of Paris 26 is forced in between the plates 17 and 18, as shown in Fig. 8. It will be understood that the patient is holding his jaws stationary during this operation and maintains his jaws stationary until the plaster of Paris has hardened or set. During this casting operation the pin 21 is barely touching the center of the stage plate 17 while pin 23 is at the front of arch 25. Both the upper and lower base plates 15 and 9' and the plates 17 and 18 and associated parts including the plaster of Paris 26, are removed as a unit from the patient's mouth and the patient is dismissed. The unit is then placed on the lower cast 11, as shown in Fig. 8, the upper arm 1 of the articulator being swung open. The upper cast 10 is then removed from the upper arm 1 and placed in the upper plate 15 where it fits perfectly. Then a small quantity of moist plaster of Paris is placed on the upper part of the cast 10 and the articulator closed. This secures the cast 10 in its new position to arm 1. As soon as this new supply of plaster of Paris has hardened, the plaster of Paris lock 26 is removed so that the upper arm of the articulator may be swung open whenever desired. After this has been done, the base plates 15 and 9', together with the metal plates 17 and 18 and associated parts, are removed from the articulator but the casts 10 and 11 are left in place. The first set of base plates 8 and 9 of the temporary dentures shown in Fig. 1, which carry the teeth 4 and 5, are then placed on the casts.

The upper arm 1 of the articulator is then swung over to a closed position very carefully and from an inspection it will be seen that the occlusion of the teeth is off. The wax 6 and 7 is then softened if necessary and the respective teeth 4 and 5 are shifted manually to produce centric occlusion. This is done, of course, by the dentist while the parts are in the articulator. Also the dentist is guided only by his eye in producing this occlusion.

After the teeth have been properly occluded as just described, an index is made of the occlusal area and also of the side of the teeth. In making an index of the occlusal area, the biting surface of the teeth is oiled somewhat and then a supply of moist plaster of Paris is provided. This plaster of Paris may be arranged on a sheet of paper or other suitable support 27, as shown in Fig. 9. When the teeth are pressed into the moist plaster of Paris 28, indentations 29 will be provided which are the reverse or negatives of the teeth. If desired, an index may be secured of both the upper and the lower occlusal area and after this has been done a supply of moist plaster of Paris 30, as shown in Figs. 10 and 11, is provided and pressed against the side teeth. If desired, this plaster of Paris could be mounted on a sheet of paper or other suitable support 31, though this is not essential. After the moist plaster of Paris has been placed in position, as shown in Fig. 10, it is left in this position until hardened and then removed. It may be easily removed because the side teeth have been oiled. A finished index for one set of side teeth is shown in Fig. 11, wherein suitable depressions 32 are presented which fit exactly the respective teeth 4 and 5. The index for the opposite side teeth is secured in the same way. The taking of these indexes is done while the temporary dentures are arranged (for the second time) in the articulator, as shown in Fig. 1.

After these indexes have been taken, the teeth 4 and 5 and the upper and lower base plates are processed in the usual way to make finished or completed dentures. A rubber substance is used in processing, commonly known in the trade as "Vulcanite." The processed dentures will have the same general appearance as the temporary dentures shown in Fig. 1, but the upper and lower base plates will be vulcanite and will be vulcanized tightly to the respective teeth 4 and 5. The processing of teeth as just described is old and well known and, therefore, further description is not thought necessary.

After the teeth have been processed as above described and final dentures produced, a new or second processed lower base plate 9" is provided. Then the two finished or completed dentures are fitted against the side indexes 31 and if there is a perfect fit modeling compound or other means is used to fasten the dentures together. The casts 10 and 11 are then fastened by moist plaster of Paris or other means to the respective dentures while the dentures are held as a unit and the casts are fastened in the articulator by means of plaster of Paris or other suitable means. After the plaster of Paris has hardened, the means for holding the dentures together is removed and the side indexes may be broken. The lower denture is then removed from the lower cast after the upper arm of the articulator has been swung to a new position. The second lower plate, which is a processed plate, is then fitted on the lower cast. A rim of modeling compound 14' is then built on the upper edge of the second or lower processed base plate 9" for approximately one-half the height of the lower teeth. A stage plate 17' is then placed on the rim of modeling compound as shown in Fig. 14. Stage plate 17' does not have the protruding portion 25' shown in Fig. 7, whereby it may fit within the teeth. The upper and completed denture is then supplied with three blocks of modeling compound 33, as shown in Figs. 12 and 13. One of these blocks is arranged as near the front center teeth as possible and the others are arranged as near the respective first molars as possible. A T-plate 18' similar to T-plate 18 is then applied to the blocks 33 and caused to adhere thereto by having these blocks slightly heated before the plate is applied. T-plate 18' has a shorter center leg than T-plate 18 so as to fit within teeth 4.

From Fig. 14 it will be seen that the T-plate 18' is slightly below the lower edge of the teeth on the upper denture. It will be noted, therefore, that the plane of the T-plate will be below the plane of occlusion and parallel with the stage plate 17', as shown particularly in Figs. 13a and 14. The stage plate 17', as shown in Fig. 14, is then provided with a mark on its upper surface substantially at the center of the lower base plate 9". The threaded pin 20' is then adjusted to barely touch the stage plate 17' at the center marking, and it will be understood that this threaded pin 20' barely touches the stage plate when the articulator is closed. After this has been done, a pointed pin 23' is mounted on the center leg 18" of the T-shaped plate 18' as near the front teeth as possible. Two spaced pins 34 are then arranged on the base of the T-shaped plate. The pins 23' and 34 have their points near but not touching the stage plate 17' when the articulator is closed. Soft recording wax 33' is then placed on the stage plate below the two pointed pins 34 and pin 23'. This is usually done when the articulator is open. The articulator is then closed and the pins 23' and 34 embed themselves in the wax and then the upper denture is removed and the lower base plate 9" also is removed. These parts are placed in the mouth of the patient while the recording wax 33' is soft. The patient is then instructed to bite and chew and to move his jaws in all directions usual during ordinary mastication of food. This action is carried out until a good record or pattern in the wax 33' of all movements of the patient's lower jaw are secured.

The upper denture 38 and the lower base plate 9" are then removed from the patient's mouth and a stone cast is made of the wax 33' and part of the stage plate 17'. This produces a negative in stone and from this negative a metal cast 37 is provided, as shown in Fig. 18. The Gothic arches 25, 35 and 36 are identical with the arches in the wax. The center pin 20' is then removed and the metal record 37 is placed against the respective pins 23' and 34 so that the apexes of the Gothic arches will receive the points of the three pins, namely, pins 23' and 34. The metal record 37 is then secured to the upper denture 38 by modeling compound or wax 39, as shown in Fig. 19. This holds the metal record 37 with the points of the pins 23' and 34 fitting into the apexes of the Gothic arches 25, 35 and 36. After this has been done the lower permanent denture 38' is placed on the lower cast in the articulator, as shown in Figs. 15 and 21. The upper permanent denture 38 is also placed in the articulator, as indicated in Fig. 15, and then the articulator is closed to make sure that the metal record 37 fits in the tongue space of the lower denture 38'. After this has been accomplished the articulator is swung to an open position and a wall of wax 40 (Fig. 17) is applied to the lower denture to form a well 41. A supply of moist plaster of Paris 41' is poured into the well 41 and then the articulator is closed, as shown in Fig. 15, which will cause the metal record plate 37 to be moved downwardly and to be partly embedded in the moist plaster of Paris in the well 41. This downward movement is continued until the teeth 4 and 5 come into contact. After the plaster of Paris in the well 41 has hardened the wax 39 is removed so that the articulator may be opened. After the articulator has been opened the upper denture 38 is removed from the upper cast 10 and placed in the position shown in Fig. 21. In doing this the upper denture 38 is so placed that the points of the pins 23' and 34 will be at the apexes of the Gothic arches in the metal record plate 37, whereby the teeth are held in centric occlusion. The upper denture is then moved by the dentist from side to side and back and forth to ascertain if there are any high points on the teeth 4 and 5. If a high point is noticed, it is ground down and this action takes place until there is a perfect occlusion in all positions of the upper denture 38 in respect to the lower denture 39. After the workman is satisfied that there is perfect occlusion, the denture 38 is removed and the T-plate is taken therefrom. Also the record plate 37 and the plaster of Paris are removed from the lower denture. This completes the construction of the two dentures and when they are placed in the mouth of the patient they will fit accurately with perfect occlusion.

While I have described and shown certain preferred methods and means suitable therefor, it is to be understood that this is by way of illustration only and that I contemplate such further changes and modifications as come within the spirit and scope of the appended claims.

I claim:

1. An instrument for recording mandibular movements and for obtaining three-dimensional records, including a lower plate having a plurality of wax-covered zones facing upwardly, an upper plate adapted to be secured to the maxilla, both of said plates being adapted to be positioned wholly within the mouth of a patient, a bearing pin carried by said upper plate and adjusted to rest on the lower plate substantially centrally thereof when making a record, and a pointed pin carried by said upper plate for each of said wax-covered zones, said pointed pins extending into the wax but not contacting with the lower plate whereby when the patient closes his mouth and moves the same forwardly, rearwardly and laterally in simulation of mastication of food, a three dimensional record will be formed in each of said wax-covered zones.

2. An instrument for recording all mandibular movements including an upper plate adapted to be positioned wholly within the mouth of a patient and secured to the maxilla, a lower plate positioned wholly within the mouth of the patient substantially parallel to the upper plate and adapted to be secured to the mandible, said lower plate being substantially triangular in shape having a wax-covered zone adjacent each corner of the plate, a manually adjustable bearing pin carried by said upper plate positioned to contact with the center zone of the lower plate to provide a proper spacing between the two plates, and a scribing pointed pin carried by said upper plate for each waxed zone and positioned so that the points thereof will extend into but not through the wax zones to form records in three dimensions when the pins are moved relative to the wax zones.

3. A device of the character described including a flat substantially triangular shaped stage plate adapted to be positioned wholly within the mouth of a patient, a plurality of spaced members having the character of wax positioned on said stage plate, a flat substantially T-shaped pin-carrying plate adapted to be positioned wholly within the mouth of the patient parallel to the stage plate, a central bearing pin adjustably secured to said T-shaped plate and positioned so that one end thereof will engage the center of the stage plate when the parts are in functioning position to maintain the vertical dimension of the patient's mouth when the mouth is in centric relation, and an adjustable pointed scribing pin positioned near the outer end of each leg of the T-shaped plate, said scribing pins being positioned to project into said spaced members and make a three-dimensional record when the jaws of the patient are moved in a plane substantially parallel to the plane of the stage plate.

4. The method of taking, within the mouth, three dimensional records of the movements of the mandible consisting in using a central bearing pin to maintain a constant separation between the maxilla and the mandible to determine the plane of occlusion in an upper and a lower denture respectively, and then forming a record by having the mandible move a wax zone in respect to a scribing member carried by the maxilla.

5. The method of obtaining balanced occlusions and the occlusal plane of a denture which consists in supporting a center spacing member on the maxilla for holding the mandible and the maxilla in occlusive spaced relation, supporting a plurality of relatively hard points on the maxilla and a metal plate on the mandible having a material soft with respect to said points in co-operative position in a patient's mouth, and causing the patient to simulate chewing action while the center spacing member is in contact with the metal plate and thereby form a plurality of record grooves in said relatively soft material.

THOMAS E. J. SHANAHAN.